United States Patent
Sassa

(10) Patent No.: US 8,786,753 B2
(45) Date of Patent: Jul. 22, 2014

(54) APPARATUS, METHOD AND PROGRAM FOR SELECTING IMAGES FOR A SLIDESHOW FROM AMONG A LARGE NUMBER OF CAPTURED IMAGES

(75) Inventor: Akira Sassa, Saitama (JP)

(73) Assignee: Sony Corporation (JP)

(*) Notice: Subject to any disclaimer, the term of this patent is extended or adjusted under 35 U.S.C. 154(b) by 435 days.

(21) Appl. No.: 12/925,215

(22) Filed: Oct. 15, 2010

(65) Prior Publication Data
US 2011/0115943 A1    May 19, 2011

(30) Foreign Application Priority Data
Nov. 18, 2009 (JP) ................. P2009-262512

(51) Int. Cl.
*H04N 5/222* (2006.01)

(52) U.S. Cl.
USPC ............... 348/333.05; 348/222.1; 348/231.2; 348/231.5

(58) Field of Classification Search
CPC ................................................ H04N 5/23293
USPC ............... 348/231.2, 231.5, 333.05, 222.1; 711/203
See application file for complete search history.

(56) References Cited

U.S. PATENT DOCUMENTS

| | | | |
|---|---|---|---|
| 8,199,221 B2* | 6/2012 | Yoshizumi | 348/231.99 |
| 2004/0130635 A1 | 7/2004 | Kasai | |
| 2007/0115373 A1* | 5/2007 | Gallagher et al. | 348/231.3 |
| 2008/0086511 A1* | 4/2008 | Takao et al. | 707/104.1 |
| 2008/0094499 A1* | 4/2008 | Ueno et al. | 348/372 |
| 2008/0162568 A1* | 7/2008 | Shen | 707/104.1 |
| 2008/0244066 A1* | 10/2008 | Yoshida et al. | 709/224 |
| 2010/0278396 A1* | 11/2010 | Mitsuhashi et al. | 382/118 |
| 2011/0115937 A1* | 5/2011 | Sassa | 348/222.1 |
| 2012/0098989 A1* | 4/2012 | Sugawara | 348/222.1 |

FOREIGN PATENT DOCUMENTS

| | | | | |
|---|---|---|---|---|
| JP | 2005-110088 A | | 4/2005 | |
| WO | WO 2009090804 A1 * | | 7/2009 | H04N 5/91 |

* cited by examiner

*Primary Examiner* — Roberto Velez
*Assistant Examiner* — Cynthia Segura
(74) *Attorney, Agent, or Firm* — Lerner, David, Littenberg, Krumholz & Mentlik, LLP

(57) ABSTRACT

An information processing apparatus which selects a predetermined number of images from a plurality of images captured at an event. The apparatus includes: an image analyzing section analyzing and calculating individual evaluation values of the images; on the basis of differences in shooting date and time and distance of adjacent images when the plurality of images are rearranged in order of shooting date and time, a first and a second clustering sections determining a first and a second boundary groups, respectively, including a plurality of boundaries for sorting the plurality of images rearranged in order of shooting date and time into a plurality of sub-events, a sorting section sorting the plurality of the images into the plurality of sub-events in accordance with the determined boundary groups; and an image selecting section determining images to be selected by excluding images having small evaluation values.

14 Claims, 11 Drawing Sheets

APPARATUS, METHOD AND PROGRAM FOR SELECTING IMAGES FOR A SLIDESHOW FROM AMONG A LARGE NUMBER OF CAPTURED IMAGES

CROSS-REFERENCE TO RELATED APPLICATION

The present application claims priority from Japanese Patent Application No. JP 2009-262512 filed in the Japanese Patent Office on Nov. 18, 2009, the entire content of which is incorporated herein by reference.

BACKGROUND OF THE INVENTION

1. Field of the Invention

The present invention relates to information processing apparatuses, information processing methods, and programs. For example, the present invention relates to an information processing apparatus, information processing method, and program that is preferably used when a user conducts a slideshow by automatically selecting images allowing the user to view his or her journey from a large number of images captured while the user was making a journey.

2. Description of the Related Art

To date, digital still cameras have often been provided with a function of so-called slideshow. The slideshow function is, for example, playing back captured and stored images sequentially in shooting order or in random order, and displaying the images on a display unit (for example, refer to Japanese Unexamined Patent Application Publication No. 2005-110088).

Incidentally, when a user of a digital still camera has captured a large number of images at an event, such as a journey, etc., and then plays back to display the images using a related-art slideshow function, it takes too much time to view all of the images, because the number of the images is too large. In order to prevent this, the user ought to select a predetermined number of images out of a large number of shot images, and conduct a slideshow using the images.

SUMMARY OF THE INVENTION

In order to select images from a large number of shot images at a predetermined rate, it is thought that, for example, images are selected at random, or evaluation values are calculated for the individual shot images on the basis of predetermined evaluation criteria, and then images are selected on the basis of the evaluation values.

However, in the above-described cases, images that the user wants to view are sometimes not displayed. Also, the selection of images might be unbalanced depending on evaluation criteria, and there might occur a case where the user fails to grasp the overall flow of an event even if the user views all the images displayed by the slideshow.

The present invention has been made in view of these circumstances. It is desirable to allow the user to select images that make it possible to grasp the overall flow of the event from a large number of images captured at an event.

According to an embodiment of the present invention, there is provided an information processing apparatus selecting a predetermined number of images from a plurality of images captured at an event, the information processing apparatus including: an image analyzing means for analyzing the plurality of images, and calculating individual evaluation values of the images; on the basis of a time-difference value indicating a difference between shooting dates and times of adjacent images when the plurality of images are rearranged in order of shooting date and time, a first clustering means for determining a first boundary group including a plurality of boundaries for sorting the plurality of images rearranged in order of shooting date and time into a plurality of sub-events; on the basis of a distance-difference value indicating a difference between shooting positions of adjacent images when the plurality of images are rearranged in order of shooting date and time, a second clustering means for determining a second boundary group including a plurality of boundaries for sorting the plurality of images rearranged in order of shooting date and time into a plurality of sub-events; a sorting means for sorting the plurality of images rearranged in order of shooting date and time into the plurality of sub-events in accordance with the determined first and second boundary groups; and an image selecting means for determining images to be selected by excluding images having small evaluation values among the images sorted for each of the sub-events.

The sorting means may sort the plurality of images rearranged in order of shooting date and time into the plurality of sub-events using a logical add of the first boundary group and the second boundary group as boundaries.

The image selecting means may determine images to be selected by excluding a predetermined rate of images out of the images sorted for each of the sub-events in ascending order of the evaluation value.

The information processing apparatus according to an embodiment of the present invention may further include a specifying means for allowing a user to specify an option including at least one of precedence of person images, precedence of scenic images, or normal as a principle of selecting images by the image selecting means.

The information processing apparatus according to an embodiment of the present invention may further include a similar-image detection means for detecting a similar image group among the plurality of images, and excludes images other than an image having a maximum evaluation value among images pertaining to the similar image group.

The image analyzing means may calculate an evaluation value evaluating at least one of a number of similar images, sizes of faces of persons to be subjects, a number of the persons, expressions of the persons, disposition of the persons, a group including the persons, or composition of scenes to be a subject for each of the plurality of images.

The information processing apparatus according to an embodiment of the present invention may further include: an image capturing means for capturing an image; and an acquiring means for acquiring information indicating a shooting date and time and a shooting location of the image.

According to another embodiment of the present invention, there is provided a method of processing information in an information processing apparatus selecting a predetermined number of images from a plurality of images captured at an event, the method including the steps of: by the information processing apparatus, analyzing the plurality of images, and calculating individual evaluation values of the images; on the basis of a time-difference value indicating a difference between shooting dates and times of adjacent images when the plurality of images are rearranged in order of shooting date and time, first clustering to determine a first boundary group including a plurality of boundaries for sorting the plurality of images rearranged in order of shooting date and time into a plurality of sub-events; on the basis of a distance-difference value indicating a difference between shooting positions of adjacent images when the plurality of images are rearranged in order of shooting date and time, second clustering to determine a second boundary group including a plurality of boundaries for sorting the plurality of images rearranged in order of shooting date and time into a plurality of sub-events; sorting the plurality of images rearranged in order of shooting date and time into the plurality of sub-events in accordance with the determined first and second boundary groups; and image-selecting to determine images to be selected by excluding images having small evaluation values among the images sorted for each of the sub-events.

According to another embodiment of the present invention, there is provided a program for controlling an information processing apparatus selecting a predetermined number of images from a plurality of images captured at an event, the program causing a computer of the information processing apparatus to perform processing including the steps of: analyzing the plurality of images, and calculating individual evaluation values of the images; on the basis of a time-difference value indicating a difference between shooting dates and times of adjacent images when the plurality of images are rearranged in order of shooting date and time, first clustering to determine a first boundary group including a plurality of boundaries for sorting the plurality of images rearranged in order of shooting date and time into a plurality of sub-events; on the basis of a distance-difference value indicating a difference between shooting positions of adjacent images when the plurality of images are rearranged in order of shooting date and time, second clustering to determine a second boundary group including a plurality of boundaries for sorting the plurality of images rearranged in order of shooting date and time into a plurality of sub-events; sorting the plurality of images rearranged in order of shooting date and time into the plurality of sub-events in accordance with the determined first and second boundary groups; and image-selecting to determine images to be selected by excluding images having small evaluation values among the images sorted for each of the sub-events.

In an embodiment of the present invention, a plurality of images are analyzed and individual evaluation values of the images are calculated. On the basis of a time-difference value indicating a difference between shooting dates and times of adjacent images when the plurality of images are rearranged in order of shooting date and time, a first boundary group including a plurality of boundaries for sorting the plurality of images rearranged in order of shooting date and time into a plurality of sub-events is determined. And on the basis of a distance-difference value indicating a difference between shooting positions of adjacent images when the plurality of images are rearranged in order of shooting date and time, a second boundary group including a plurality of boundaries for sorting the plurality of images rearranged in order of shooting date and time into a plurality of sub-events is determined. Further, the plurality of images rearranged in order of shooting date and time are sorted into the plurality of sub-events in accordance with the determined first and second boundary groups. And the images to be selected are determined by excluding the images having small evaluation values among images sorted for each of the sub-events.

By an embodiment of the present invention, it is possible to allow the user to select images that make it possible to grasp the overall flow of the event from a large number of images captured at an event.

DESCRIPTION OF THE PREFERRED EMBODIMENTS

In the following, descriptions will be given of best modes for carrying out the invention (hereinafter referred to as embodiments). In this regard, the descriptions will be given in the following order.

Figure 1:
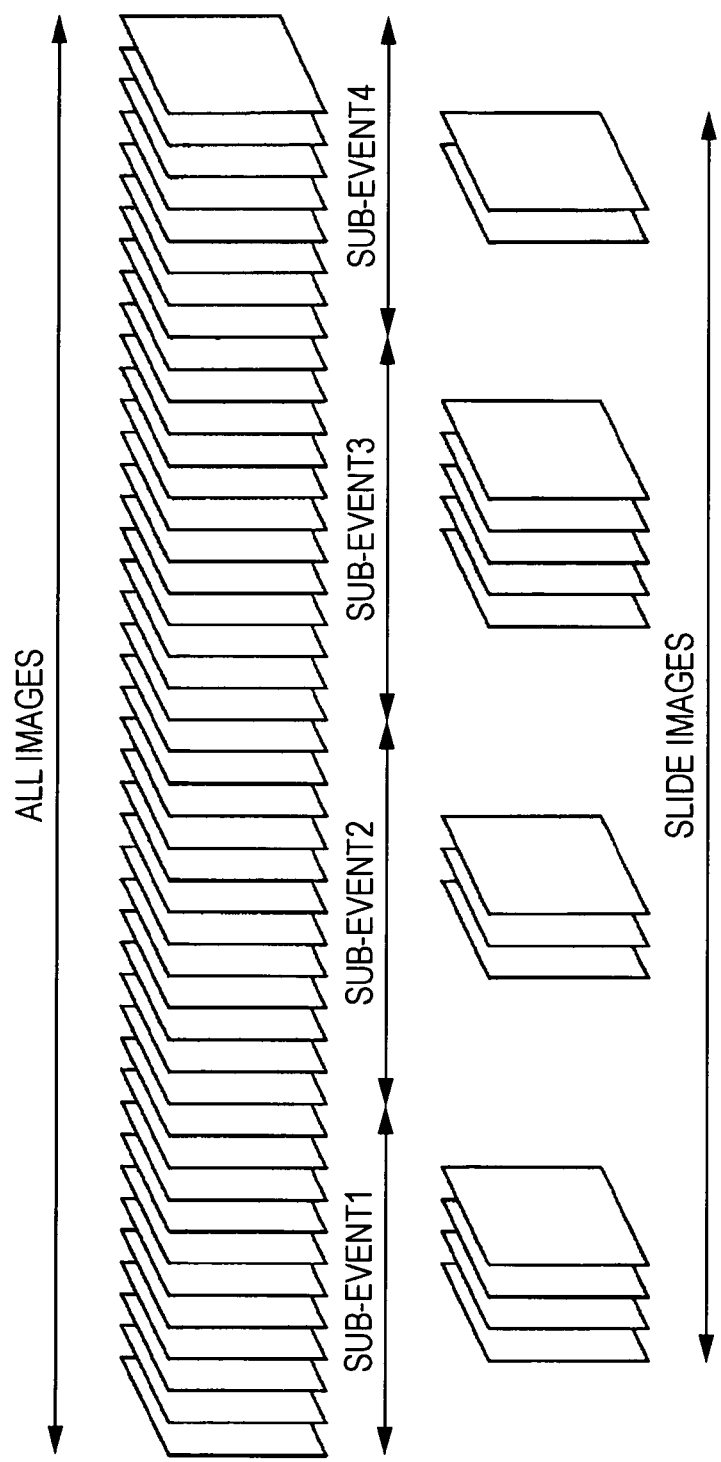
FIG. 1 is a diagram for illustrating an overview of the present invention.

1. Overview of the Present Invention
2. First Embodiment
3. Second Embodiment
4. Variation 1. Overview of the Present Invention FIG. 1 is a diagram for illustrating an overview of the present invention. In the present invention, all the images captured at an event, such as a journey, for example, are sorted into a plurality of sub-events in accordance with shooting dates and times and shooting locations, and images are selected from images pertaining to each sub-event in order to allow the user to view an overall flow of the event.

2. First Embodiment

Example of Configuration of Digital Still Camera

Figure 2:
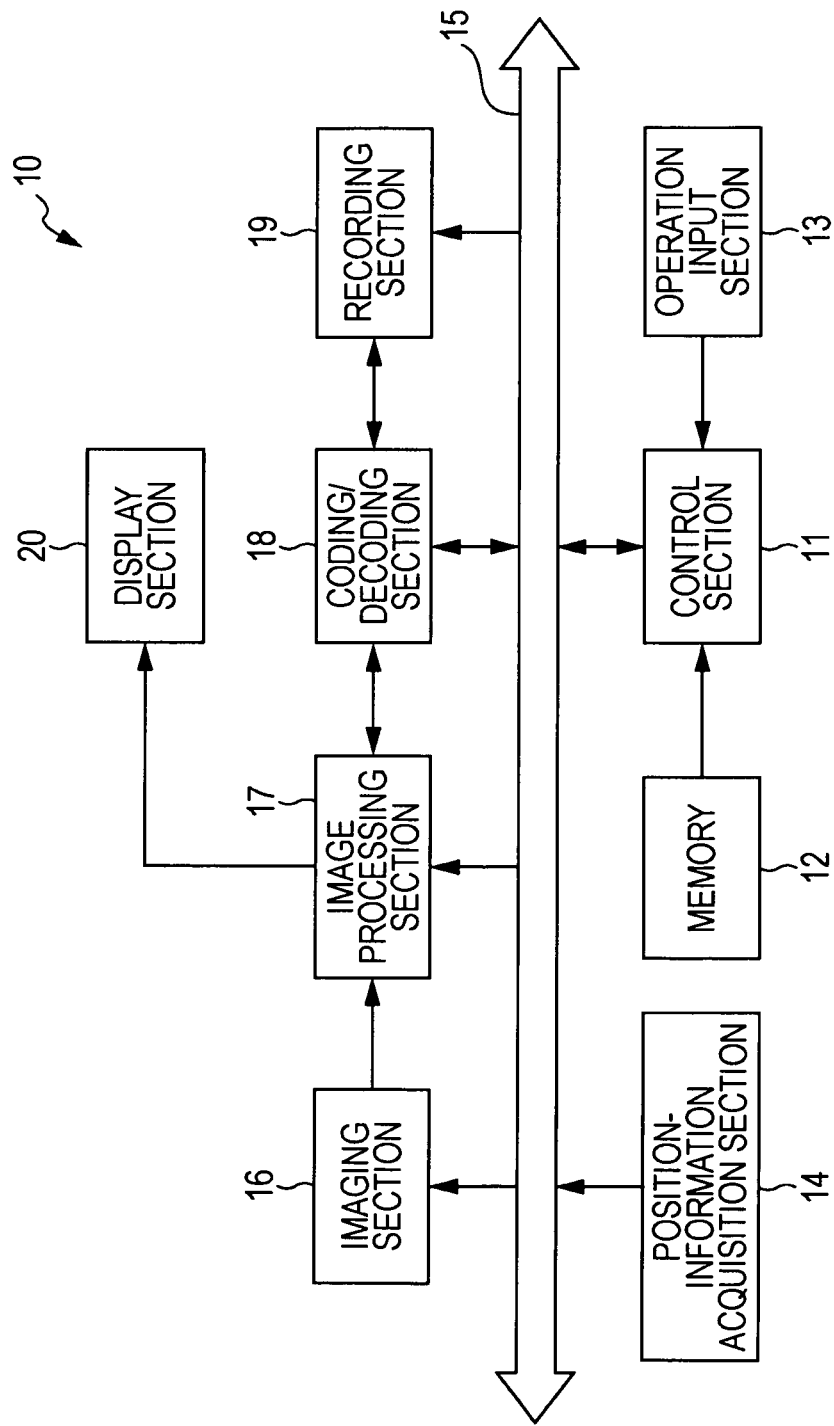
FIG. 2 is a block diagram illustrating an example of a configuration of a digital still camera to which the present invention is applied.

FIG. 2 illustrates an example of a configuration of a digital still camera according to a first embodiment. The digital still camera 10 includes a control section 11, a memory 12, an operation input section 13, a position-information acquisition section 14, a bus 15, an imaging section 16, an image processing section 17, a coding/decoding section 18, a recording section 19, and a display section 20.

The control section 11 controls each section of the digital still camera 10 in accordance with an operation signal in response to user's operation input from the operation input section 13. Also, the control section 11 performs a control program recorded in the memory 12 so as to achieve the functional blocks shown in FIG. 3, and performs slide-image selection processing, etc., described later.

The control program is recorded in the memory 12 in advance. Also, the memory 12 holds various kinds of information in the process of slide-image selection processing.

The operation input section 13 includes a user interface including buttons disposed on a case of the digital still camera 10 and a touch panel, etc., laminated on the display section 20, and generates an operation signal in accordance with an operation by the user to output the signal to the control section 11.

The position-information acquisition section 14 receives and analyzes a GPS (Global Positioning System) signal at shooting timing, and thus obtains information indicating shooting date and time (date, time) and a position (latitude, longitude, altitude). Here, the obtained information indicating shooting date and time and the position is adopted as exif information, which is recorded in association with the captured image. In this regard, for the shooting date and time, time information of a clock contained in the control section 11 may be used.

The imaging section 16 includes a lens group and a photoelectric conversion element, such as a CCD, a CMOS, etc., and converts an optical image of a subject, which is incident through the lens group, into an image signal by the photoelectric conversion element, and outputs the image signal to the image processing section 17.

The image processing section 17 performs predetermined image processing on the image signal input from the imaging section 16 to output the signal to the coding/decoding section 18. Also, the image processing section 17 performs thinning, etc., of pixels of image signals input from the imaging section 16 and input from the coding/decoding section 18 at image capture time and at playback time, respectively, to generate an image signal for display, and outputs the signal to the display section 20.

At image capture time, the coding/decoding section 18 performs coding on the image signal input from the image processing section 17 in accordance with a JPEG method, etc., and outputs a coded image signal obtained as a result to the recording section 19. Also, at playback time, the coding/decoding section 18 performs decoding on a coded image signal input from the recording section 19, and outputs the obtained image signal as a result to the image processing section 17.

At image capture time, the recording section 19 records the coded image signal input from the coding/decoding section 18 on the recording media (not shown in the figure). Also, the recording section 19 records the exif information related to the coded image signal on the recording media. Further, at playback time, the recording section 19 reads out the coded image signal recorded on the recording media, and outputs the signal to the coding/decoding section 18.

The display section 20 includes a liquid crystal display, etc., and displays an image of an image signal input from the image processing section 17.

Figure 3:
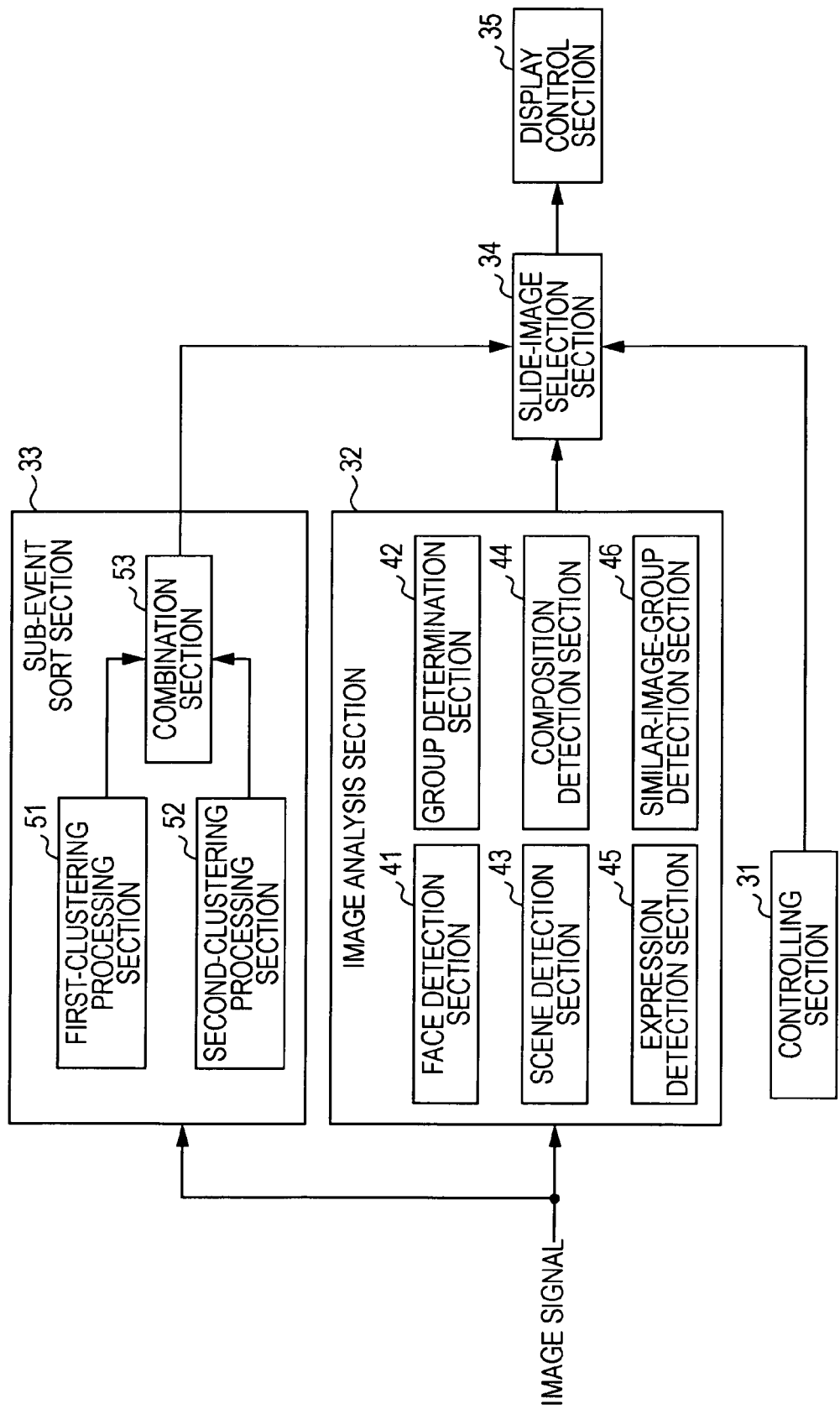
FIG. 3 is a diagram illustrating an example of a configuration of functional blocks achieved by the control section.

Next, FIG. 3 illustrates an example of a configuration of functional blocks achieved by the control section 11 performing the control program. These functional blocks are individually operated, and thereby the slide-image selection processing is achieved. However, the individual functional blocks shown in FIG. 3 may be configured by hardware, such as IC chips, etc.

The controlling section 31 controls operation of each functional block in FIG. 3. The image analysis section 32 includes a face detection section 41, a group determination section 42, a scene detection section 43, a composition detection section 44, an expression detection section 45, and a similar-image group detection section 46, and performs image analysis on all the images recorded on the recording media in sequence.

The face detection section 41 detects faces of persons that are in the input image, and identifies a number of subject persons. Also, the face detection section 41 calculates feature quantities of the detected faces.

The group determination section 42 performs clustering of the feature quantity of the detected faces so as to identify images in which the same person is captured as a subject. Also, the group determination section 42 estimates a group (which means, for example, a couple, a parent and child, a family, and the other groups including a plurality of persons) to which a subject person belongs in accordance with frequencies of existence in a same image, distances, positions, etc., of the faces. Also, the group determination section 42 determines an important group in accordance with an appearance frequency of each group in all the images. Further, the group determination section 42 determines an important person in accordance with appearance frequencies of the individual persons in all the images.

The scene detection section 43 determines whether an input image is a scenic image having nature and a streetscape as a subject or not, and calculates an evaluation value as a scenic image of the image determined to be a scenic image. For the calculation of an evaluation value, it is possible to use an SVM (Support Vector Machine) in which good scenic images have been learned as teacher data in advance.

The composition detection section 44 calculates an evaluation value indicating how good composition of a person image is on the basis of the number of detected faces of persons in an input image and a size and a position of each face.

The expression detection section 45 calculates an evaluation value indicating an expression of each face (laughing, being angry, looking straight at the camera, etc.) on the basis of feature quantities of the faces of the persons detected in the input image.

The similar-image group detection section 46 sorts images input in sequence into similar image groups in accordance with the similarities of the feature quantities, and selects an image having a highest overall evaluation value from a similar image group as a representative image, excluding the other images from candidates of slide images. In this regard, that there are many similar images is a proof that the user (photographer) is interested in and gives great importance to the subject. Accordingly, the overall evaluation value of a representative image may further be increased in accordance with the number of images pertaining to a similar image group.

The sub-event sort section 33 includes a first clustering processing section 51, a second clustering processing section 52, and a combination section 53, and sorts all the images captured at an event into a plurality of sub-events on the basis of the shooting dates and times and the shooting positions.

The first clustering processing section 51 determines sub-event segment positions when all the images are sorted in order of shooting date and time on the basis of the shooting dates and times of all the images captured at an event. The second clustering processing section 52 determines sub-event segment positions when all the images are sorted in order of shooting date and time on the basis of the shooting positions of all the images captured at the event.

The combination section 53 combines the sub-event segment positions determined by the first clustering processing section 51 and the sub-event segment positions determined by the second clustering processing section 52 by a logical add operation, and sorts all the images captured at the event into any one of the sub-events.

The slide-image selection section 34 selects slide images from the images sorted for each sub-event by excluding the images in ascending order of the evaluation value thereof.

The display control section 35 controls execution of a slideshow targeted for the slide images selected from all the images captured at the event. That is to say, the display control section 35 controls the recording section 19 to read out the coded image signal corresponding to the images selected for the slide images in sequence from the recording media, controls the coding/decoding section 18 to decode the signal, and controls the display section 20 to display the image corresponding to the image signal obtained as a result.

Operation Description

Figure 4:
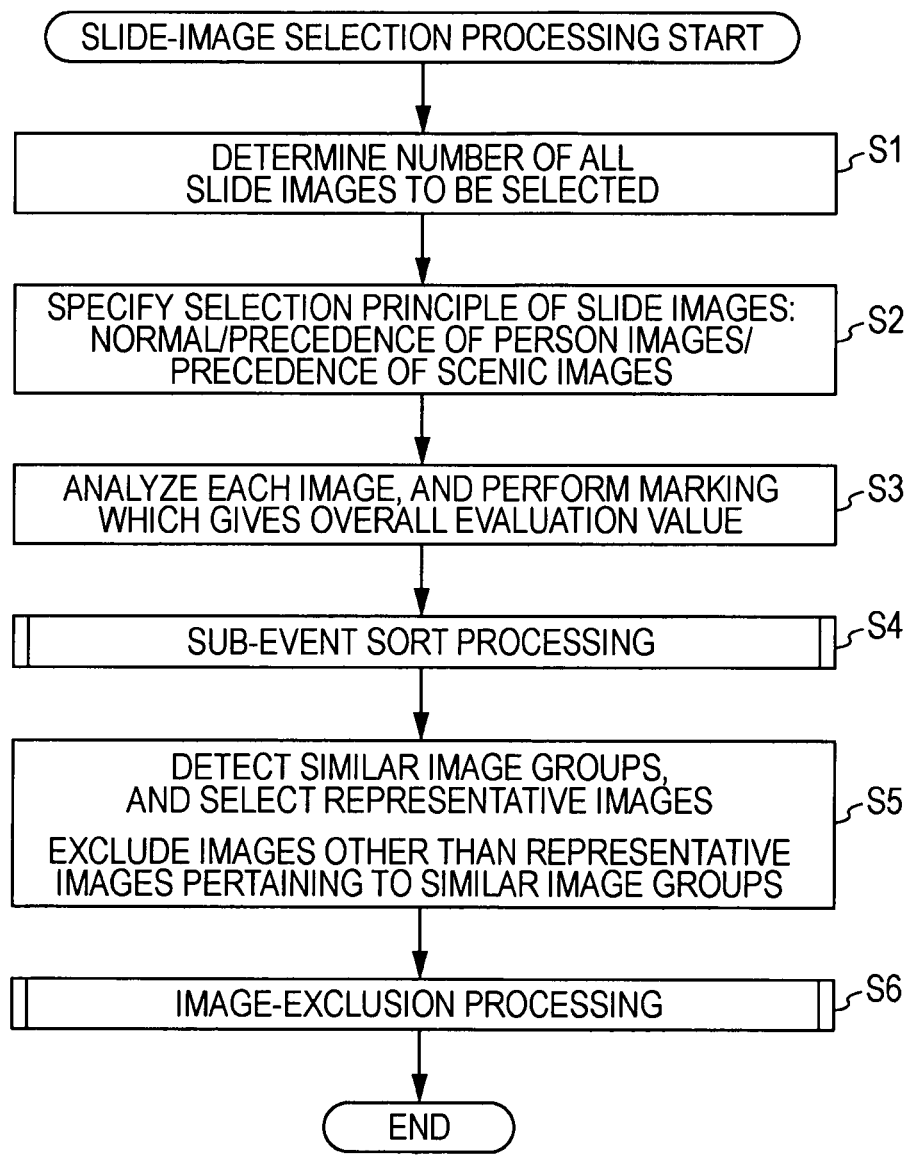
FIG. 4 is a flowchart illustrating slide-image selection processing.

Next, a description will be given of operation of the digital still camera 10. FIG. 4 is a flowchart illustrating the slide-image selection processing.

The slide-image selection processing is performed when the user instructs a start of the processing, for example, in a state in which a large number of images captured at an event, such as a journey, etc., are stored in the recording media.

In step S1, the controlling section 31 determines the number of pieces to be selected (hereinafter referred to as the number of selection pieces) as slide images from all the images captured at the event. Method of this determination is, for example, based on calculation by multiplying a predetermined rate in accordance with the number of pieces of all the images captured at the event, and in accordance with a playback time period of music played back simultaneously with the slideshow and display intervals of the slide images. In this regard, the user may specify the number of selection pieces.

In step S2, the controlling section 31 allows the user to specify any one of normal, precedence of person images, or precedence of scenic images as a selection principle of slide images. Here, if normal is specified, person images and scenic images are substantially equally selected. If precedence of person images is specified, person images are selected by priority. If precedence of scenic images is specified, scenic images are selected by priority. In this manner, by allowing the user to specify the selection principle, it is possible to select images that meet the intention and the purpose of the user.

In step S3, the image analysis section 32 obtains all the images captured at the event in sequence and analyzes the images, calculates evaluation values f1 to f5 of each of the images from various points of view, and adds them with weights to determine an overall evaluation value F of each of the images.

Specifically, the image analysis section 32 calculates an evaluation value f1 on a representative image of each similar image group in accordance with the number of images pertaining to the similar image group. Also, the image analysis section 32 calculates an evaluation value f2 in accordance with the sizes, positions, and expressions of faces detected from each image, the number of subject persons and composition, etc. Further, the image analysis section 32 calculates an evaluation value f3 in accordance with a plurality of face sizes, adjacent states, and positions detected from each image. Also, further, if a person who belongs to an important group is a subject by oneself, the image analysis section 32 adds an evaluation value f4. Further, the image analysis section 32 calculates an evaluation value f5 indicating an evaluation as a scenic image.

And as shown in the following expression, the image analysis section 32 multiplies the calculated evaluation values f1, f2, f3, f4, and f5 by predetermined weighting factors k1, k2, k3, k4, and k5, respectively, and adds them up to calculate an overall evaluation value F.

$$F = k1 \times f1 + k2 \times f2 + k3 \times f3 + k4 \times f4 + k5 \times f5$$

Further, in step S3, the image analysis section 32 performs marking (means that the images are not excluded from candidates of the slide images) on predetermined images. Specifically, the image analysis section 32 performs marking on an image having a highest overall evaluation value F among images including an important person as a subject. Also, the image analysis section 32 performs marking on an image having a highest overall evaluation value F among images including all the persons who belong to an important group.

In step S4, the sub-event sort section 33 performs sub-event sort processing in which all the images are sorted into a plurality of sub-events on the basis of the shooting date and time and the shooting position.

A detailed description will be given of the sub-event sort processing with reference to FIGS. 5 to 8.

Figure 5:
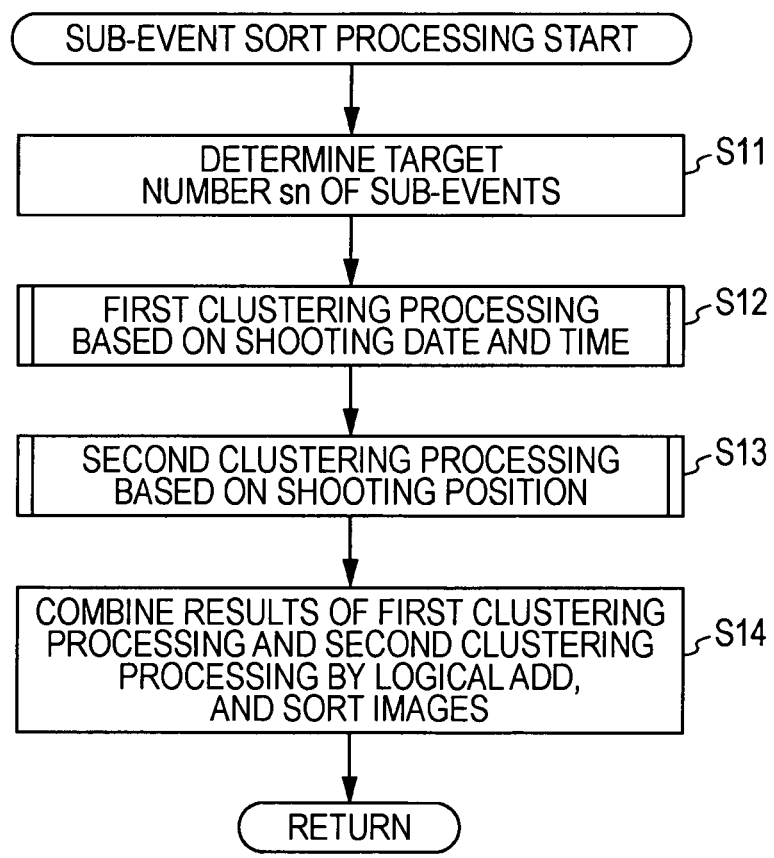
FIG. 5 is a flowchart illustrating sub-event sort processing.

FIG. 5 is a flowchart illustrating the sub-event sort processing in detail. In step S11, the controlling section 31 determines a target number sn of sub-events in accordance with the number of all the images. In the following, it is tentatively assumed that the target number of sub-events sn=5.

In step S12, the first clustering processing section 51 performs first clustering processing on the basis of the shooting date and time of each image. In step S13, the second clustering processing section 52 performs the second clustering processing on the basis of the shooting position of each image. In this regard, it is possible to perform the first clustering processing in step S12 and the second clustering processing in step S13 in parallel.

Figure 6:
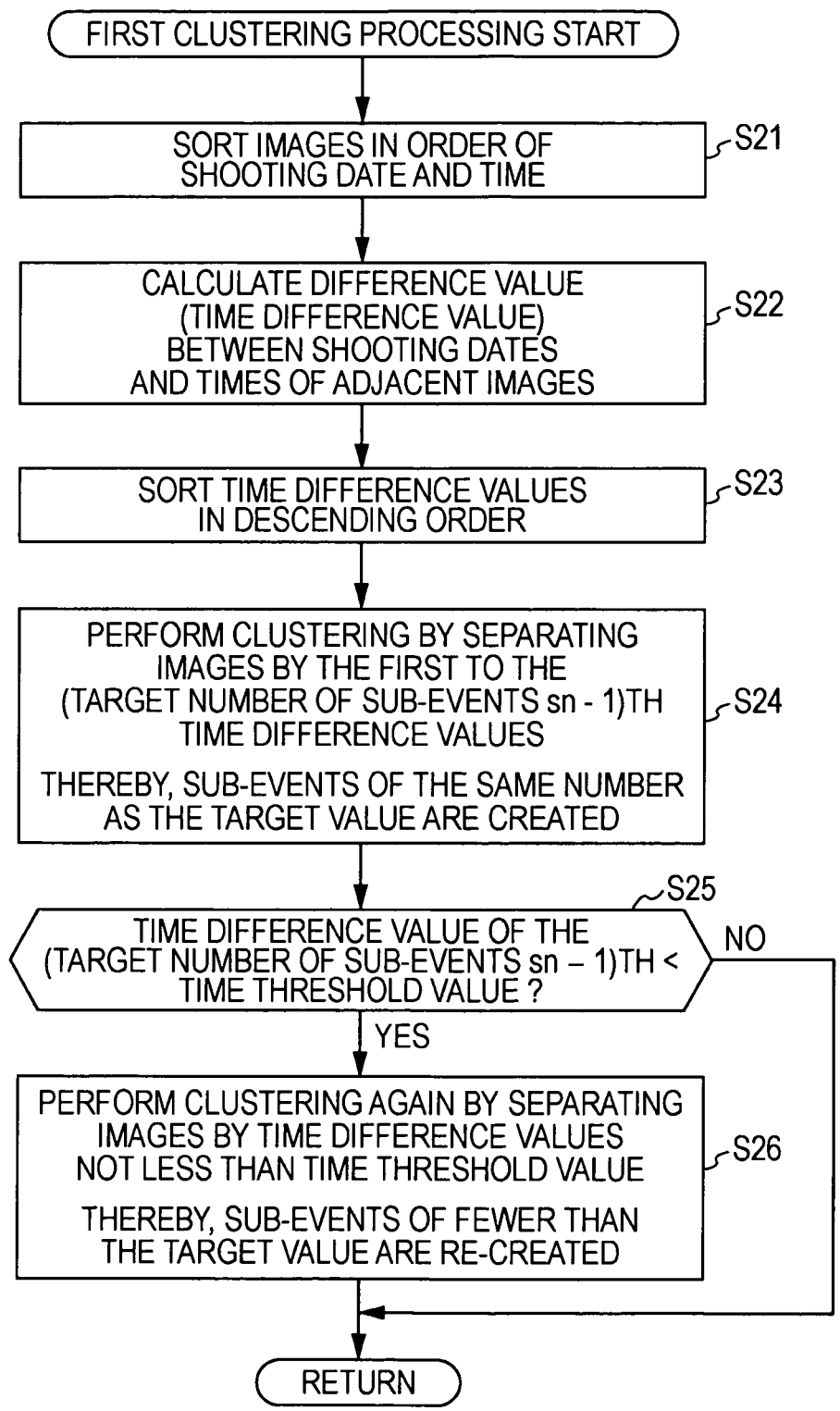
FIG. 6 is a flowchart illustrating first clustering processing.

FIG. 6 is a flowchart illustrating the first clustering processing. In step S21, the first clustering processing section 51 rearranges all the images in order of shooting date and time. In step S22, the first clustering processing section 51 calculates a difference value of the shooting date and time (hereinafter referred to as a time difference value) between adjacent images.

In step S23, the first clustering processing section 51 rearranges the images in descending order of the calculated time difference values. In step S24, the first clustering processing section 51 determines image segments corresponding to a first (maximum time difference value) time difference value to the (target value sn−1)th time difference value to be sub-event segment positions.

Figure 7:
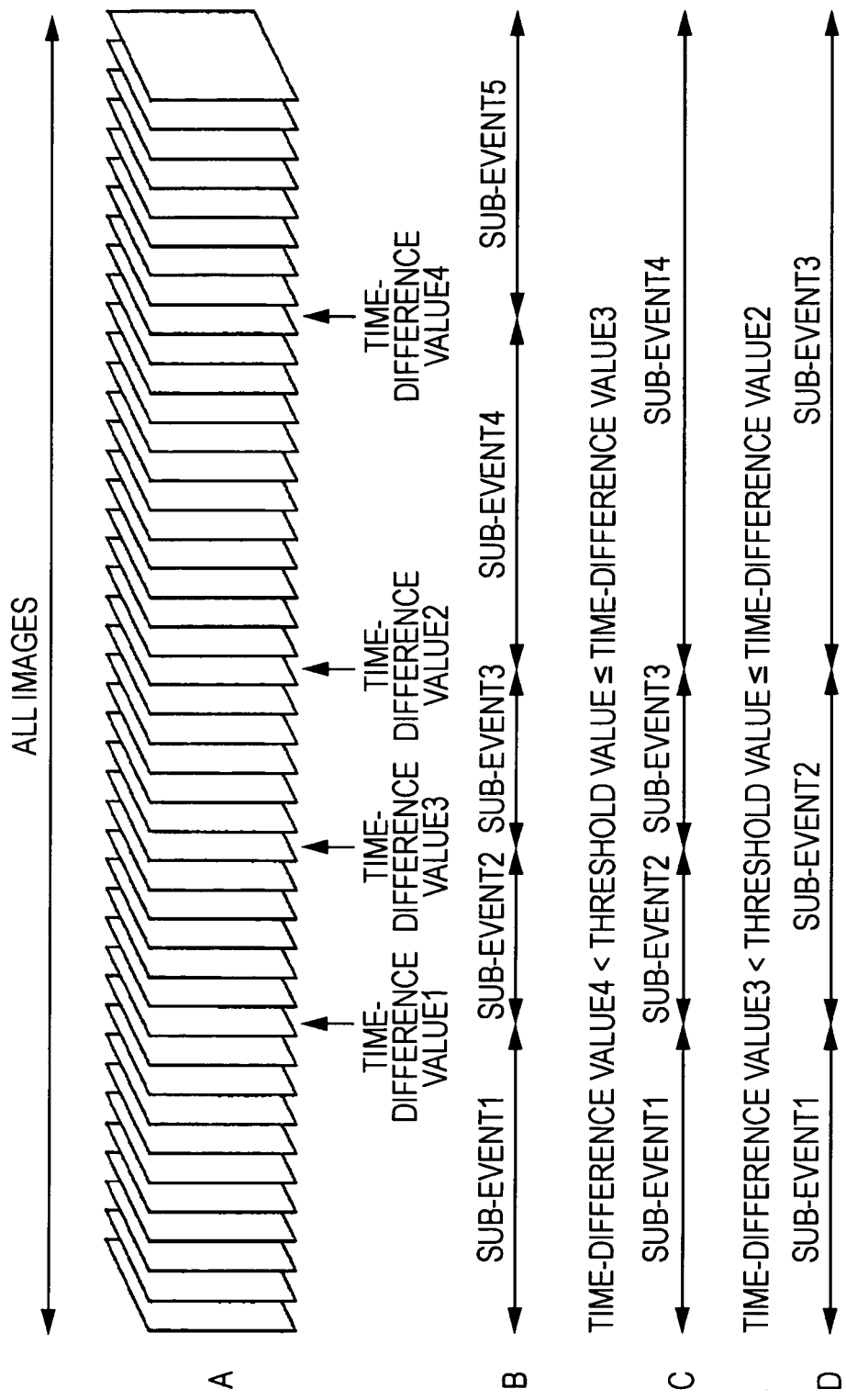
FIG. 7 is a diagram for illustrating sub-event segments.

For example, if it is assumed that the time difference values between images shown in FIG. 7A in descending order is time difference value 1, time difference value 2, time difference value 3, and time difference value 4, since the target value sn=5, the image segments corresponding to time difference value 1 to time difference value 4 are determined to be sub-event segment positions. As a result, as shown in B in FIG. 7, sub-events of the same number as the target value sn=5 are generated.

In step S25, the first clustering processing section determines whether the (target value sn−1)th time difference value is less than a preset time threshold value. If determined the value is less than the threshold value, the processing proceeds to step S26.

In step S26, the first clustering processing section 51 cancels the sub-event segment position determined in step S24, and determines again only the image segments corresponding to the time difference value not less than the time threshold value to be sub-event segment positions from the image segments corresponding to a first (maximum time difference value) time difference value to the (target value sn−1)th time difference value.

For example, as shown by C in FIG. 7, if a period from time difference value 1 to time difference value 3 is not less than the time threshold value, and only time difference value 4 is less than the time threshold value, the image segments corresponding to time difference value 1, time difference value 2, and time difference value 3, respectively, are determined to be sub-event segment positions. As a result, 4 sub-events, which are fewer than the target value sn=5, are generated.

Also, for example, as shown by D in FIG. 7, if time difference value 1 and time difference value 2 are not less than the time threshold value, and time difference value 3 and time difference value 4 is less than the time threshold value, the image segments corresponding to time difference value 1, and time difference value 2, respectively are determined to be sub-event segment positions. As a result, 3 sub-events, which are fewer than the target value sn=5, are generated.

In this regard, in step S25, if determined that the (target value sn−1)th time difference value is not less than the preset time threshold value, the processing skips step S26. Accordingly, in this case, as shown by B in FIG. 7, the sub-events of the same number as the target value sn are generated and maintained. The first clustering processing is completed.

Figure 8:
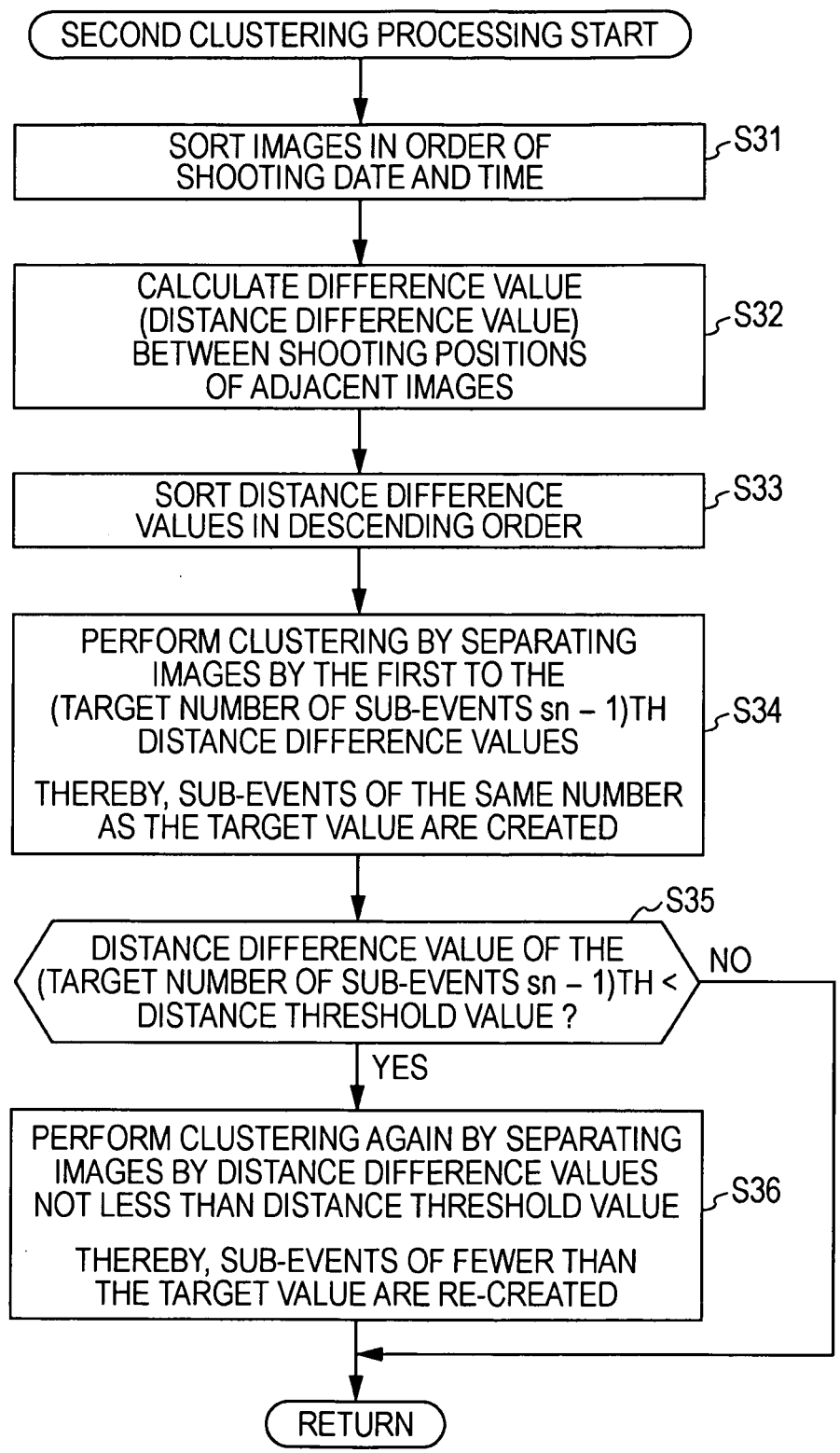
FIG. 8 is a flowchart illustrating second clustering processing.

FIG. 8 is a flowchart illustrating the second clustering processing. In step S31, the second clustering processing section 52 rearranges all the images in order of shooting date and time. In step S32, the second clustering processing section 52 calculates the difference value of shooting positions between adjacent images (hereinafter referred to as a distance difference value).

In step S33, the second clustering processing section 51 rearranges the images in descending order of the calculated distance difference value. In step S34, the second clustering processing section 52 determines image segments corresponding to a first (maximum distance difference value) distance difference value to the (target value sn−1)th distance difference value to be sub-event segment positions. As a result, the sub-events of the same number as the target value sn are generated.

In step S35, the second clustering processing section 52 determines whether the (target value sn−1)th time difference value is less than a preset distance threshold value. If determined the value is less than the threshold value, the processing proceeds to step S36.

In step S36, the second clustering processing section 52 cancels the sub-event segment positions determined in step S34, and determines again only the image segments corresponding to the distance difference values not less than the distance threshold value to be sub-event segment positions from the image segments corresponding to a first (maximum distance difference value) distance difference value to the (target value sn−1)th distance difference value. As a result, the sub-events of fewer than the target value sn are generated.

In this regard, in step S35, if determined that the (target value sn−1)th distance difference value is not less than the preset distance threshold value, the processing skips step S36. Accordingly, in this case, the sub-events of the same number as the target value sn are generated and maintained. The second clustering processing is completed.

As described above, sub-events of up to the same number as the target value sn are generated on the basis of image capture time in the first clustering processing and on the basis of the shooting position in the second clustering processing.

Referring back to FIG. 5, in step S14, the combination section 53 combines the sub-event segment positions determined by the first clustering processing section 51 and the sub-event segment positions determined by the second clustering processing section 52 using a logical add operation, and sorts all the images captured at the event into any one of the sub-events.

By the above-described sub-event sort processing, all the images are sorted into any one of sub-events of twice the number of the target value sn at the maximum. However, the sub-event segment positions determined by the first clustering processing and the sub-event segment positions determined by the second clustering processing often match, and thus it is thought that the number of sub-events does not increase excessively. On the other hand, for example, if the user visited a same place twice on an outward trip and on a return trip, the images captured on the outward trip and the images captured on the return trip are not sorted into a same sub-events, and can be sorted into different sub-events.

Referring back to FIG. 4, in step S5, the similar-image group detection section 46 of the image analysis section 32 sorts individual images into similar image groups in accordance with the similarity of the feature quantities thereof. Specifically, the similar-image group detection section 46 performs HSV (Hue, Saturation, Value) conversion in order to obtain feature quantities of each image, performs rough quantization on the feature quantities, then performs histogram processing, and compares histograms between adjacent images in shooting date and time. If the difference value is not higher than a predetermined threshold value, the similar-image group detection section 46 determines that the images belong to a similar image group. Also, the similar-image group detection section 46 determines a similar image group on the basis of the similarity of composition.

Further, in step S5, the similar-image group detection section 46 selects an image having a highest overall evaluation value F from each similar image group as a representative image, and excludes the other images from the candidates of the slide images.

In step S6, the slide-image selection section 34 performs image exclusion processing in which slide images are selected by excluding individual images sorted for each sub-event in ascending order of the overall evaluation value F from the candidates of the slide images. A detailed description will be given of the image exclusion processing.

Figure 9:
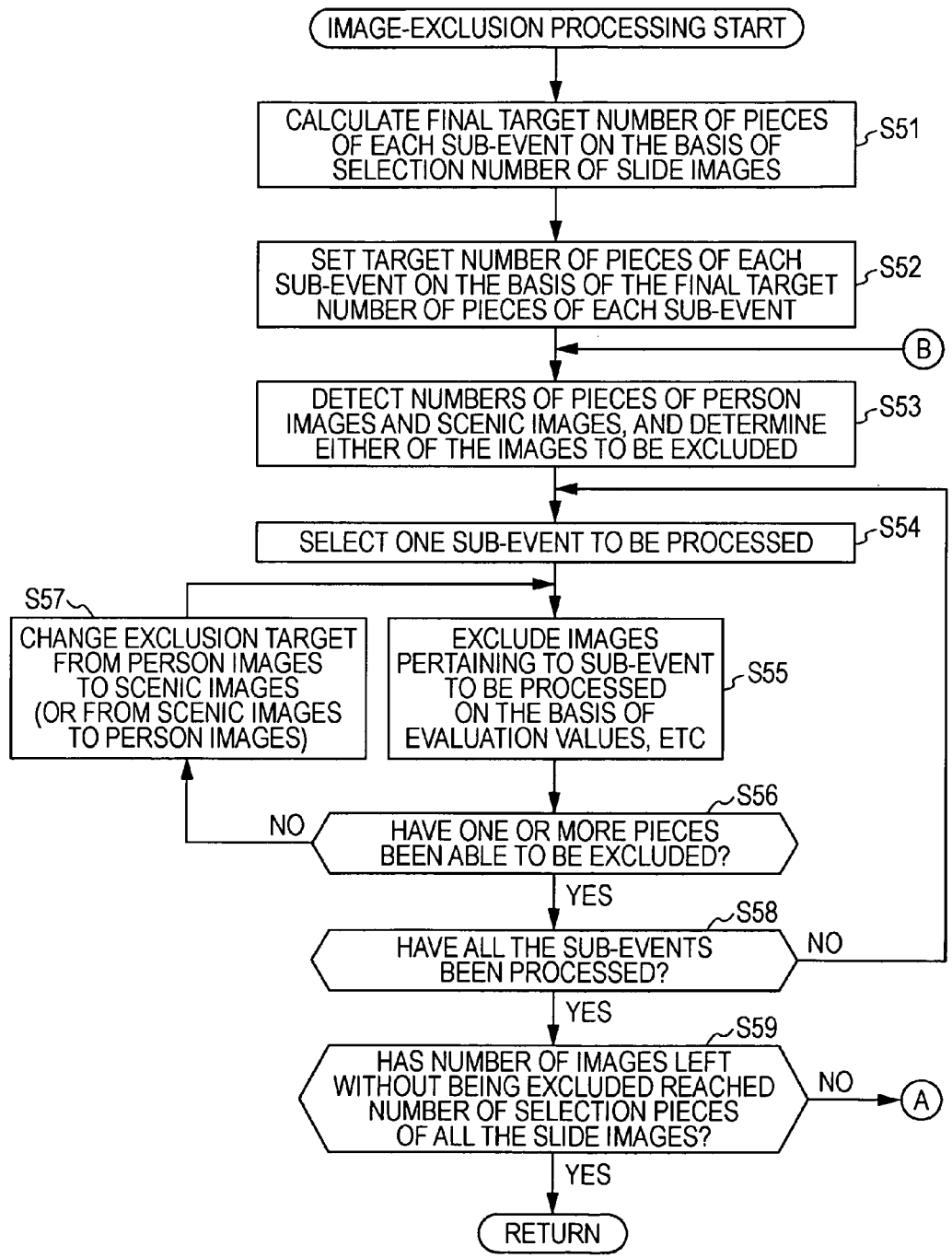
FIG. 9 is a flowchart illustrating image reduction processing.
Figure 10:
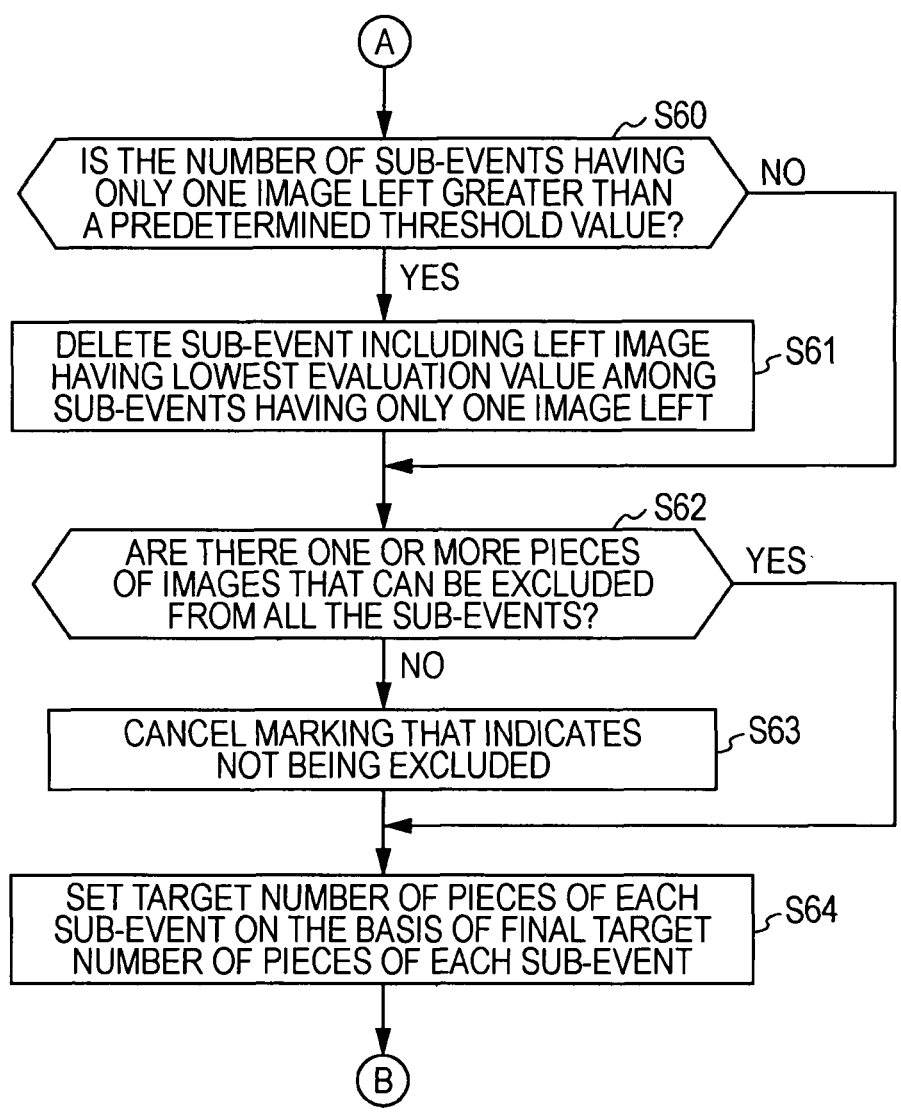
FIG. 10 is the flowchart illustrating image reduction processing.

FIGS. 9 and 10 are flowcharts illustrating the image exclusion processing. In step S51, the controlling section 31 determines a target number of images to be finally remained in each sub-event (hereinafter referred to as a final target number of pieces) on the basis of the number of all the images, the number of selection pieces determined in step S1, and the number of pieces sorted into each sub-event. Specifically, the controlling section 31 determines for example, the product of a rate of a number of selection pieces to the number of all the images, and the number of images sorted into each sub-event to be a final target number of pieces of each sub-event.

In step S52, the controlling section 31 sets the target number of pieces to a value higher than the final target number of pieces on the basis of the final target number of pieces of each sub-event determined in step S51. For example, the controlling section 31 sets the target number of pieces to 20 percent higher than the final target number of pieces. In this regard, the target number of pieces is gradually set to a number close to the final target number of pieces each time the processing of step S53 and after is repeated.

In step S53, the slide-image selection section 34 obtains the number of pieces of person images and scenic images on the basis of the analysis result of the image analysis section 32, and then determines whether person images or scenic images are excluded (images to be excluded) in the subsequent processing in accordance with the selection principle (normal, precedence of person images, or precedence of scenic images) specified in step S2.

In step S54, the slide-image selection section 34 specifies one sub-event as processing target in order of shooting date and time.

In step S55, the slide-image selection section 34 excludes images to be excluded (either person images or scenic images) without having been marked among the images sorted into the sub-event to be processed from the candidates of the slide images in ascending order of the overall evaluation value F thereof. And the number of pieces left without being excluded (number of selection pieces) is brought close to the target value set in step S52. However, if there is only one image left without being excluded among the images pertaining to the sub-event, that image is not excluded. That is to say, in this stage, at least one piece of image is left (selected) for each sub-event. However, the sub-event itself is sometimes deleted in the subsequent processing in step S61.

In step S56, the slide-image selection section 34 determines whether one or more images sorted into the sub-event to be processed have been able to be excluded from slide-image candidates in the immediately preceding step S55. If none has been able to be excluded, the processing proceeds to step S57. In step S57, the slide-image selection section 34 changes the target to be excluded. Specifically, if person images are to be excluded currently, scenic images are to be excluded. On the contrary, if scenic images are to be excluded currently, person images are to be excluded. After that, the processing returns to step S55, and the subsequent processing is repeated.

In this regard, in step S56, if one or more images sorted into the sub-event to be processed have been able to be excluded from slide-image candidates in the immediately preceding step S55, the processing proceeds to step S58.

In step S58, the slide-image selection section 34 determines whether all the sub-events have been specified to be processed. Until determined that all the sub-events have been specified to be processed, the processing returns to step S54, and the subsequent processing is repeated. And in step S58, if determined that all the sub-events have been specified to be processed, the processing proceeds to step S59.

In step S59, the slide-image selection section 34 determines whether the total number of the images left without having been excluded from the slide-image candidates (selected images) among the images pertaining to each sub-event has reached the number of selection pieces determined in step S1. If determined having not reached, the processing proceeds to step S60 in FIG. 10.

In step S60, the slide-image selection section 34 identifies the number of sub-events having only one image left without having been excluded (selected) from slide-image candidates within the including images among all the sub-events. Further, the slide-image selection section 34 determine whether the number of the sub-events is not less than a predetermined threshold value. If determined that the number of the sub-events is not less than the predetermined threshold value, the processing proceeds to step S61. On the contrary, if determined less, the processing of step S61 is skipped.

In step S61, the slide-image selection section 34 compares the overall evaluation values of the images that are left (selected) as only one piece in the sub-events, and deletes a sub-event to which the image having a lowest value belongs.

In step S62, the slide-image selection section 34 determines whether there is one piece or more images that can be excluded (that is to say, not marked images) in all the sub-events. Only if determined there is none, the processing proceeds to step S63. On the contrary, if determined there is one piece or more images, the processing of step S63 is skipped.

In step S63, the slide-image selection section 34 cancels the marking of the marked image. Thereby, all the remaining images are allowed to be excluded.

In step S64, the controlling section 31 sets the target number of pieces to a value closer to the final target number of pieces than the current target number of pieces on the basis of the final target number of pieces of each sub-event determined in step S51. After that, the processing returns to step S53 in FIG. 9, and the subsequent processing is repeated.

And in step S59, if determined that the total number of the images that are left without having been excluded from slide-image candidates (selected) among the images pertaining to each sub-event has reached the number of selection pieces determined in step S1, the image exclusion processing is terminated.

In this regard, among images pertaining to each sub-event, if the total number of images left (selected) without having been excluded from the slide image candidates has reached the number of selection pieces determined in step S1, but when too many images have been excluded and the number of selected images is less than the number of selection pieces, images are released from the excluded images (added to selection) in descending order of the overall evaluation value F.

On the contrary, even if the processing of step S53 described above and the subsequent processing is repeated for a predetermined number of times, when there are many remaining pieces, and that number fails to reach the number of selection pieces, regardless of the remaining number of pieces of the sub-event and marked images, images are excluded in ascending order of the overall evaluation value F among the remaining images.

In the above, the description has been completed of the image exclusion processing and the slide-image selection processing.

By the above-described slide-image selection processing, it becomes possible to select images which are collected from an overall event, such as a journey, etc., in a balanced manner, which help to easily understand the process of the event, and which include points of worthy to see.

3. Second Embodiment

Example of Configuration of Computer

In the digital still camera 10 according to the above-described first embodiment, the camera itself captures images. However, in a computer according to a second embodiment, slide-image selection processing is performed on a plurality of images (captured at an event) input from the outside.

Figure 11:
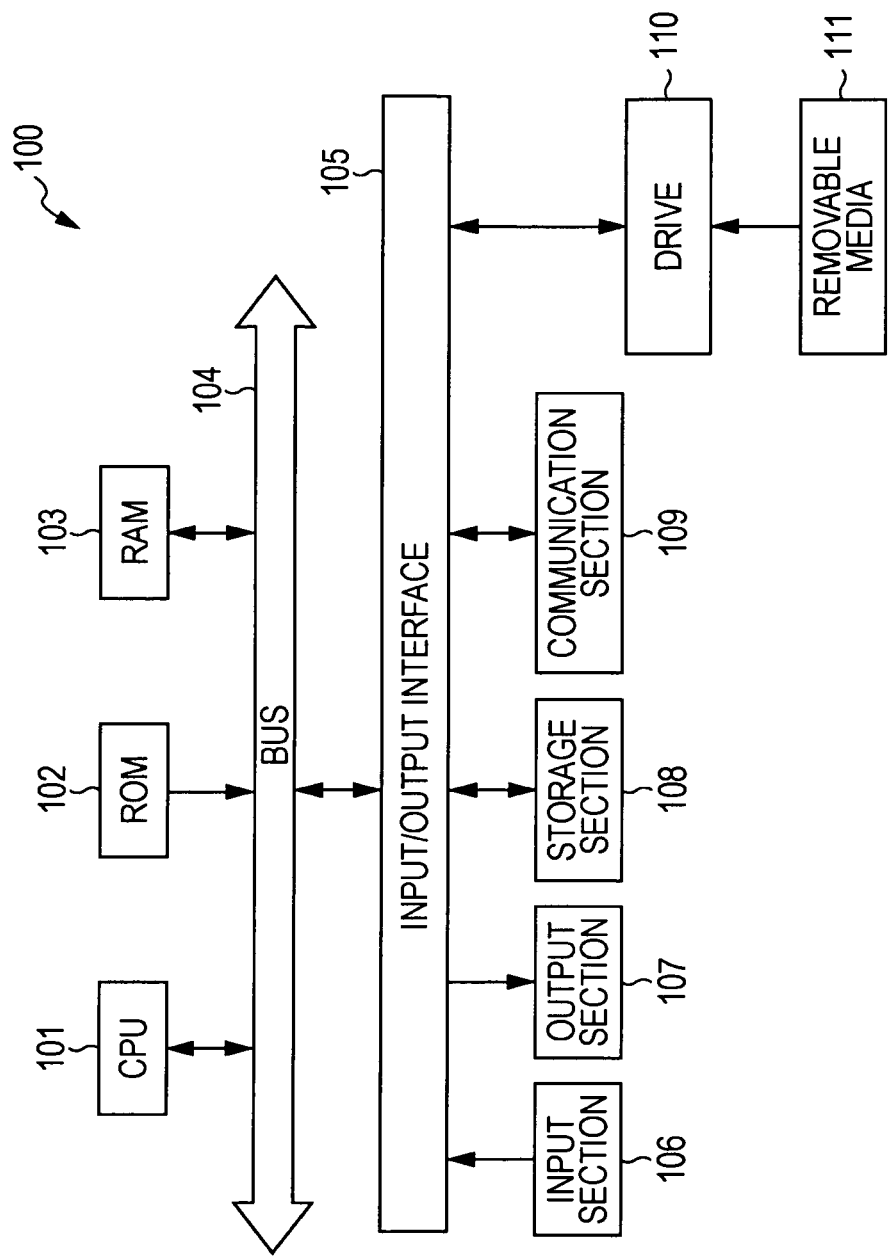
FIG. 11 is a block diagram illustrating an example of a configuration of a computer.

FIG. 11 illustrates an example of a configuration of a computer according to the second embodiment. In the computer 100, a CPU (Central Processing Unit) 101, a ROM (Read Only Memory) 102, a RAM (Random Access Memory) 103 are mutually connected through a bus 104.

An input/output interface 105 is also connected to the bus 104. An input section 106 including a keyboard, a mouse, a microphone, etc., an output section 107 including a display, a speaker, etc., a storage section 108 including a hard disk, a nonvolatile memory, etc., a communication section 109 including a network interface, etc., and a drive 110 for driving a removable medium 111, such as a magnetic disk, an optical disc, a magneto-optical disc, or a semiconductor memory, etc., are connected to the input/output interface 105.

In the computer having the configuration as described above, the CPU 101 loads the program stored, for example in storage section 108 to the RAM 103 through the input/output interface 105 and the bus 104 to execute the program, and thereby the above-described slide-image selection processing is performed.

In this regard, the programs executed by the computer may be programs that are processed in time series in accordance with the described sequence in this specification. Alternatively, the programs may be the programs to be executed in parallel or at necessary timing, such as at the time of being called, or the like.

In this regard, the present invention can be applied not only to the case of selecting images to be displayed at a slideshow, but also to the case of selecting images for a photograph collection, for example.

4. Variation

In this regard, the above-described first and second embodiments are not limited to the above-described contents. It is possible to make various changes without departing from the gist of the present invention. Also, the following expansions are considered.

A function of presenting a list of sub-events (including deleted sub-events) to the user, and allowing the user to restore important images from deleted sub-events in response to the user's instruction may be added. On the contrary, a function of allowing the user to specify and delete unnecessary sub-events may be added.

On the basis of shooting position information of an image, a predetermined database may be retrieved to identify a landmark name of the shooting position, and the landmark name may be given as a title of a sub-event. Also, the user may be allowed to give any title and comments to each sub-event.

Further, a function of automatically creating a user's time schedule table, itinerary, etc., at the time of conducting an event on the basis of the information of the shooting date and time and shooting position of each image may be added.

Further, in cooperation with an application displaying a map, a function of displaying positions of sub-events and a travel route on the map may be added.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus selecting a predetermined number of images from a plurality of images captured at an event, the information processing apparatus comprising:
    an image analyzing means for analyzing the plurality of images, and calculating individual evaluation values of the images;
    on the basis of a time-difference value indicating a difference between shooting dates and times of adjacent images when the plurality of images are rearranged in order of shooting date and time, a first clustering means for determining a first boundary group including a plurality of boundaries for sorting the plurality of images rearranged in order of shooting date and time into a plurality of sub-events;
    on the basis of a distance-difference value indicating a difference between shooting positions of adjacent images when the plurality of images are rearranged in order of shooting date and time, a second clustering means for determining a second boundary group including a plurality of boundaries for sorting the plurality of images rearranged in order of shooting date and time into a plurality of sub-events;
    a sorting means for sorting the plurality of images rearranged in order of shooting date and time into the plurality of sub-events in accordance with the determined first and second boundary groups;
    an image selecting means for determining images to be selected which includes excluding images having small evaluation values from among the images sorted for each of the sub-events by the sorting means; and
    in which the image selecting means is for determining the images to be selected in accordance with (i) precedence of person images, (ii) precedence of scenic images, and (iii) normal, as a principle of selecting images,
    a specifying means for allowing a user to specify a desired one of (i) the precedence of person images, (ii) the precedence of scenic images, or (iii) the normal, as the principle of selecting images by the image selecting means, in which when the precedence of person images principle is specified the image selecting means will give priority to the person images for selection when excluding images having small evaluation values from among the images sorted for each of the sub-events by the sorting means, when the precedence of scenic images principle is specified the image selecting means will give priority to the scenic images for selection when excluding images having small evaluation values from among the images sorted for each of the sub-events by the sorting means, and when the normal principle is specified the image selecting means will give equal priority to the person images and the scenic images for selection when excluding images having small evaluation values from among the images sorted for each of the sub-events by the sorting means, and
    in which each evaluation value is obtained by combining a plurality of calculated evaluation values, in which a first calculated evaluation value is calculated in accordance with sizes, positions and expressions of faces in a respective image and number of people in the respective image, and a second calculated evaluation value is calculated in accordance with composition of scene in the respective image.

2. The information processing apparatus according to claim 1,
    wherein the sorting means sorts the plurality of images rearranged in order of shooting date and time into the plurality of sub-events using a logical add of the first boundary group and the second boundary group as boundaries.

3. The information processing apparatus according to claim 2,
    wherein the image selecting means determines images to be selected by excluding a predetermined rate of images out of the images sorted for each of the sub-events in ascending order of the evaluation value.

4. The information processing apparatus according to claim 2, further comprising a similar-image detection means for detecting a similar image group among the plurality of images, and excludes images other than an image having a maximum evaluation value among images pertaining to the similar image group.

5. The information processing apparatus according to claim 2, further comprising:
    an image capturing means for capturing an image; and
    an acquiring means for acquiring information indicating a shooting date and time and a shooting location of the image.

6. The information processing apparatus according to claim 1, in which the first clustering means determines whether any said time difference value is less than a predetermined value.

7. The information processing apparatus according to claim 6, in which when the first clustering means determines that a respective time difference value is less than the predetermined value, the respective sub-event is canceled and remaining images are rearranged.

8. A method of processing information in an information processing apparatus selecting a predetermined number of images from a plurality of images captured at an event, the method comprising the steps of:

by the information processing apparatus, analyzing the plurality of images, and calculating individual evaluation values of the images;

on the basis of a time-difference value indicating a difference between shooting dates and times of adjacent images when the plurality of images are rearranged in order of shooting date and time, first clustering to determine a first boundary group including a plurality of boundaries for sorting the plurality of images rearranged in order of shooting date and time into a plurality of sub-events;

on the basis of a distance-difference value indicating a difference between shooting positions of adjacent images when the plurality of images are rearranged in order of shooting date and time, second clustering to determine a second boundary group including a plurality of boundaries for sorting the plurality of images rearranged in order of shooting date and time into a plurality of sub-events;

sorting the plurality of images rearranged in order of shooting date and time into the plurality of sub-events in accordance with the determined first and second boundary groups;

image-selecting to determine images to be selected which includes excluding images having small evaluation values among the images sorted for each of the sub-events by the sorting step, in which the image-selecting step is to determine the images to be selected in accordance with (i) precedence of person images, (ii) precedence of scenic images, and (iii) normal, as a principle of selecting images; and specifying to allow a user to specify a desired one of (i) the precedence of person images, (ii) the precedence of scenic images, or (iii) the normal, as the principle of selecting images by the image-selecting step, in which when the precedence of person images principle is specified the image-selecting step will give priority to the person images for selection when excluding images having small evaluation values from among the images sorted for each of the sub-events by the sorting step, when the precedence of scenic images principle is specified the image-selecting step will give priority to the scenic images for selection when excluding images having small evaluation values from among the images sorted for each of the sub-events by the sorting step, and when the normal principle is specified the image-selecting step will give equal priority to the person images and the scenic images for selection when excluding images having small evaluation values from among the images sorted for each of the sub-events by the sorting step, and in which each evaluation value is obtained by combining a plurality of calculated evaluation values, in which a first calculated evaluation value is calculated in accordance with sizes, positions and expressions of faces in a respective image and number of people in the respective image, and a second calculated evaluation value is calculated in accordance with composition of scene in the respective image.

9. A non-transitory computer-readable medium having stored thereon a program for controlling an information processing apparatus selecting a predetermined number of images from a plurality of images captured at an event, the program causing a computer of the information processing apparatus to perform processing comprising the steps of:

analyzing the plurality of images, and calculating individual evaluation values of the images;

on the basis of a time-difference value indicating a difference between shooting dates and times of adjacent images when the plurality of images are rearranged in order of shooting date and time, first clustering to determine a first boundary group including a plurality of boundaries for sorting the plurality of images rearranged in order of shooting date and time into a plurality of sub-events;

on the basis of a distance-difference value indicating a difference between shooting positions of adjacent images when the plurality of images are rearranged in order of shooting date and time, second clustering to determine a second boundary group including a plurality of boundaries for sorting the plurality of images rearranged in order of shooting date and time into a plurality of sub-events;

sorting the plurality of images rearranged in order of shooting date and time into the plurality of sub-events in accordance with the determined first and second boundary groups; and image-selecting to determine images to be selected which includes excluding images having small evaluation values among the images sorted for each of the sub-events by the sorting step, in which the image-selecting step is to determine the images to be selected in accordance with (i) precedence of person images, (ii) precedence of scenic images, and (iii) normal, as a principle of selecting images; and specifying to allow a user to specify a desired one of (i) the precedence of person images, (ii) the precedence of scenic images, or (iii) the normal, as a principle of selecting images by the image-selecting step, in which when the precedence of person images principle is specified the image-selecting step will give priority to the person images for selection when excluding images having small evaluation values from among the images sorted for each of the sub-events by the sorting step, when the precedence of scenic images principle is specified the image-selecting step will give priority to the scenic images for selection when excluding images having small evaluation values from among the images sorted for each of the sub-events by the sorting step, and when the normal principle is specified the image-selecting step will give equal priority to the person images and the scenic images for selection when excluding images having small evaluation values from among the images sorted for each of the sub-events by the sorting step, and in which each evaluation value is obtained by combining a plurality of calculated evaluation values, in which a first calculated evaluation value is calculated in accordance with sizes, positions and expressions of faces in a respective image and number of people in the respective image, and a second calculated evaluation value is calculated in accordance with composition of scene in the respective image.

10. An information processing apparatus selecting a predetermined number of images from a plurality of images captured at an event, the information processing apparatus comprising:

an image analyzing mechanism analyzing the plurality of images, and calculating individual evaluation values of the images;

on the basis of a time-difference value indicating a difference between shooting dates and times of adjacent images when the plurality of images are rearranged in order of shooting date and time, a first clustering mechanism determining a first boundary group including a plurality of boundaries for sorting the plurality of images rearranged in order of shooting date and time into a plurality of sub-events;

on the basis of a distance-difference value indicating a difference between shooting dates and times of adjacent images when the plurality of images are rearranged in order of shooting date and time, a second clustering mechanism for determining a second boundary group including a plurality of boundaries for sorting the plurality of images rearranged in order of shooting date and time into a plurality of sub-events;

a sorting mechanism sorting the plurality of images rearranged in order of shooting date and time into the plurality of sub-events in accordance with the determined first and second boundary groups; and an image selecting mechanism determining images to be selected which includes excluding images having small evaluation values among the images sorted for each of the sub-events by the sorting mechanism, in which the image selecting mechanism is to determine the images to be selected in accordance with (i) precedence of person images, (ii) precedence of scenic images, and (iii) normal, as a principle of selecting images; and a specifying mechanism allowing a user to specify a desired one of (i) the precedence of person images, (ii) the precedence of scenic images, or (iii) the normal, as the principle of selecting images by the image selecting mechanism, in which when the precedence of person images principle is specified the image selecting mechanism will give priority to the person images for selection when excluding images having small evaluation values from among the images sorted for each of the sub-events by the sorting mechanism, when the precedence of scenic images principle is specified the image selecting mechanism will give priority to the scenic images for selection when excluding images having small evaluation values from among the images sorted for each of the sub-events by the sorting mechanism, and when the normal principle is specified the image selecting mechanism will give equal priority to the person images and the scenic images for selection when excluding images having small evaluation values from among the images sorted for each of the sub-events by the sorting mechanism, and in which each evaluation value is obtained by combining a plurality of calculated evaluation values, in which a first calculated evaluation value is calculated in accordance with sizes, positions and expressions of faces in a respective image and number of people in the respective image, and a second calculated evaluation value is calculated in accordance with composition of scene in the respective image.

11. The information processing apparatus according to claim 10,
wherein the sorting mechanism sorts the plurality of images rearranged in order of shooting date and time into the plurality of sub-events using a logical add of the first boundary group and the second boundary group as boundaries.

12. The information processing apparatus according to claim 10,
wherein the image selecting mechanism determines images to be selected by excluding a predetermined rate of images out of the images sorted for each of the sub-events in ascending order of the evaluation value.

13. The information processing apparatus according to claim 10, further comprising a similar-image detection mechanism detecting a similar image group among the plurality of images, and excludes images other than an image having a maximum evaluation value among images pertaining to the similar image group.

14. The information processing apparatus according to claim 10, further comprising:
an image capturing mechanism capturing an image; and
an acquiring mechanism acquiring information indicating a shooting date and time and a shooting location of the image.

* * * * *